(12) United States Patent
Kline et al.

(10) Patent No.: US 8,671,162 B2
(45) Date of Patent: Mar. 11, 2014

(54) SYSTEM AND METHOD FOR PUSHING DATA TO A MOBILE DEVICE

(75) Inventors: Robert Kline, Richmond Hill (CA); Michael Shenfield, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 465 days.

(21) Appl. No.: 13/109,273

(22) Filed: May 17, 2011

(65) Prior Publication Data
US 2011/0218951 A1 Sep. 8, 2011

Related U.S. Application Data

(63) Continuation of application No. 12/497,854, filed on Jul. 6, 2009, now Pat. No. 7,970,860, which is a continuation of application No. 10/507,083, filed as application No. PCT/CA03/00339 on Mar. 11, 2003, now abandoned.

(60) Provisional application No. 60/362,930, filed on Mar. 11, 2002.

(51) Int. Cl.
*G06F 15/16* (2006.01)

(52) U.S. Cl.
USPC .......................................... 709/219; 709/203

(58) Field of Classification Search
USPC ................................................. 709/203, 219
See application file for complete search history.

(56) References Cited

U.S. PATENT DOCUMENTS

| | | | |
|---|---|---|---|
| 5,727,129 A | 3/1998 | Barrett et al. | |
| 5,878,223 A | 3/1999 | Becker et al. | |
| 5,935,207 A | 8/1999 | Logue et al. | |
| 6,023,606 A | 2/2000 | Monte et al. | |
| 6,038,601 A | 3/2000 | Lambert et al. | |
| 6,055,569 A | 4/2000 | O'Brien et al. | |
| 6,182,133 B1 * | 1/2001 | Horvitz | 709/223 |
| 6,317,438 B1 | 11/2001 | Trebes, Jr. | |
| 6,321,205 B1 | 11/2001 | Eder | |
| 6,385,454 B1 | 5/2002 | Bahl et al. | |
| 6,640,284 B1 | 10/2003 | Shaw et al. | |
| 6,721,780 B1 | 4/2004 | Kasriel et al. | |
| 6,742,033 B1 | 5/2004 | Smith et al. | |

(Continued)

FOREIGN PATENT DOCUMENTS

WO 01/60014 A2 8/2001

OTHER PUBLICATIONS

Markatos et al., A Top-10 Approach to Prefetching on the Web, Aug. 1996, pp. 1-15, Technical Report 173, ICS-FORTH (http://www.ics.forth.gr/proj/arch-visi-www.html), Heraklio, Crete, Greece, XP002104432.

Padmanabhan et al., Using Predictive Prefetching to Improve World Wide Web Latency, Jul. 1, 1996, pp. 22-36, Computer Communications Review, Association for Computing Machinery, vol. 26, No. 3, New York, US, XP000607179.

(Continued)

*Primary Examiner* — Asghar Bilgrami
(74) *Attorney, Agent, or Firm* — Jones Day

(57) ABSTRACT

A method for handling information requests from mobile devices includes a memory, a state prediction module, and a push module. The memory is operable to store data requests received from the mobile devices. The state prediction module is operable to access the memory to predict forecasted data requests for a mobile device based on the stored data requests. The push module is operable to receive the forecasted data requests from the state prediction module and in response request and receive response data related to the forecasted data requests and prepare the response data for transmission to the mobile device over a wireless network.

20 Claims, 11 Drawing Sheets

(56) References Cited

U.S. PATENT DOCUMENTS

| | | |
|---|---|---|
| 6,766,422 B2 | 7/2004 | Beyda |
| 6,871,218 B2 | 3/2005 | Desai et al. |
| 7,003,566 B2 | 2/2006 | Codella et al. |
| 7,113,935 B2 | 9/2006 | Saxena |
| 2002/0083148 A1 | 6/2002 | Shaw et al. |
| 2002/0103778 A1 | 8/2002 | Saxena |
| 2002/0165925 A1 | 11/2002 | Hamilton et al. |
| 2003/0005038 A1 | 1/2003 | Codella et al. |
| 2003/0061451 A1 | 3/2003 | Beyda |
| 2003/0088580 A1 | 5/2003 | Desai et al. |
| 2003/0110296 A1 | 6/2003 | Kirsch et al. |
| 2003/0220984 A1* | 11/2003 | Jones et al. .................. 709/219 |

OTHER PUBLICATIONS

El-Saddik et al., Exploiting User Behaviour in Prefetching WWW Documents, accepted for International Workshop on Interactive Distributed Multimedia Systems and Telecommunication Services '98, Oslo, Norway, Sep. 8-11, 1998 (10 pgs).

Su et al., WhatNext: A Prediction System for Web Requests using N-gram Sequence Models (8 pgs) Jun. 2000.

Sarukkai, Link Prediction and Path Analysis Using Markov Chains, http://www9.org/w9cdrom/68/68.html (15 pgs) printed Feb. 8, 2003.

* cited by examiner

SYSTEM AND METHOD FOR PUSHING DATA TO A MOBILE DEVICE

This is a continuation of U.S. application Ser. No. 12/497,854 filed on Jul. 6, 2009, which is a continuation of U.S. application Ser. No. 10/507,083 filed (nationalized) on Sep. 8, 2004, which claims the benefit of and priority to International Application Number PCT/CA03/00339 filed on Mar. 11, 2003, which claimed the benefit of and priority to U.S. Provisional Application No. 60/362,930 filed on Mar. 11, 2002; all the above applications, including their specifications, drawings, and attachments, hereby incorporated herein by reference.

BACKGROUND

1. Technical Field

This application relates generally to systems and methods for providing data to a mobile communication device ("mobile device"), and in particular to systems and methods for pushing forecasted data to a mobile device.

2. Description of the Related Art

Typically, when a user of a desktop computer or a mobile device requests data, the user will often make another, subsequent data request after examining the reply data received in response to the initial data request. Desktop computers typically have high-bandwidth, low-latency access to computer networks, such as local area networks (LANs), wide area networks (WANs), and the Internet. Thus, response data to these subsequent data requests are usually provided quickly when using a desktop computer.

A mobile device that communicates over a wireless network, however, typically does not have a relatively high-bandwidth, low-latency communication path to these networks, because many wireless networks may have signal propagation delays, a limited RF spectrum, and signal fade-outs. Accordingly, when the user of the mobile device requests subsequent data, the user typically must contend with the inherent latency and bandwidth limitations of the wireless network. A number of wireless communication protocols have been developed to accommodate mobile device data requests, including Wireless Application Protocol (WAP), compressed Hypertext Markup Language (cHTML), Extensible HTML (xHTML), and Extensible Markup Language (XML), and others. Nevertheless, these communication protocols are still subject to the inherent latency and bandwidth characteristics of the wireless network. Thus, the user of the mobile device must often wait for reply data to be received at the mobile device in response to the subsequent data request.

SUMMARY

A system for handling information requests from mobile devices includes a memory, a state prediction module, and a push module. The memory is operable store data requests received from the mobile devices. The state prediction module is operable to receive a data request from a mobile device and in response access the memory and predict a forecasted data request based on the received data request and the stored data requests. The push module is operable to receive the received data request and the forecasted data request from the state prediction module and in response request and receive response data related to the received data request and the forecasted data request and prepare the response data for transmission to the mobile device over a wireless network.

A system for handling data requests from mobile devices comprises a memory, a state prediction module, and a push module. The memory is operable to store data requests received from at least one mobile device. The state prediction module is operable to access the memory and predict a first forecasted data request for a mobile device based on the stored data requests. The push module is operable to receive the first forecasted data request from the state prediction module and in response request and receive first response data related to the first forecasted data request and prepare the first response data for transmission to the mobile device over a wireless network.

A system for handling information requests from mobile devices includes a data collection unit, a data adjustment unit, an analysis unit, and a push unit. The data collection unit is operable to receive and store data requests received from the mobile devices and to store prediction data based on the stored data requests. The data adjustment unit is operable to receive a data request from a mobile device and access the stored data requests and generate the prediction data and store the prediction data in the data collection unit. The analysis unit is operable to access the prediction data stored in the data collection unit and execute a prediction algorithm to predict forecasted data requests. The push unit is operable to receive the received data request and the forecasted data requests and in response request and receive response data related to the received data request and the forecasted data requests and prepare the response data for transmission to the mobile device over a wireless network.

A mobile communication device includes a communication subsystem operable to communicate over a wireless network, a memory subsystem operable to store data, and a processing subsystem operable to instruct the communication subsystem to transmit and receive data over the wireless network and to store data to and read data from the memory subsystem. A client program comprising processing subsystem executable instructions is stored in the memory subsystem, and is operable to predict data requests and receive response data to the data requests. A client program cache is operable to store the response data, and a push cache is operable to store forecasted data based on data requests.

DETAILED DESCRIPTION

Figure 1:
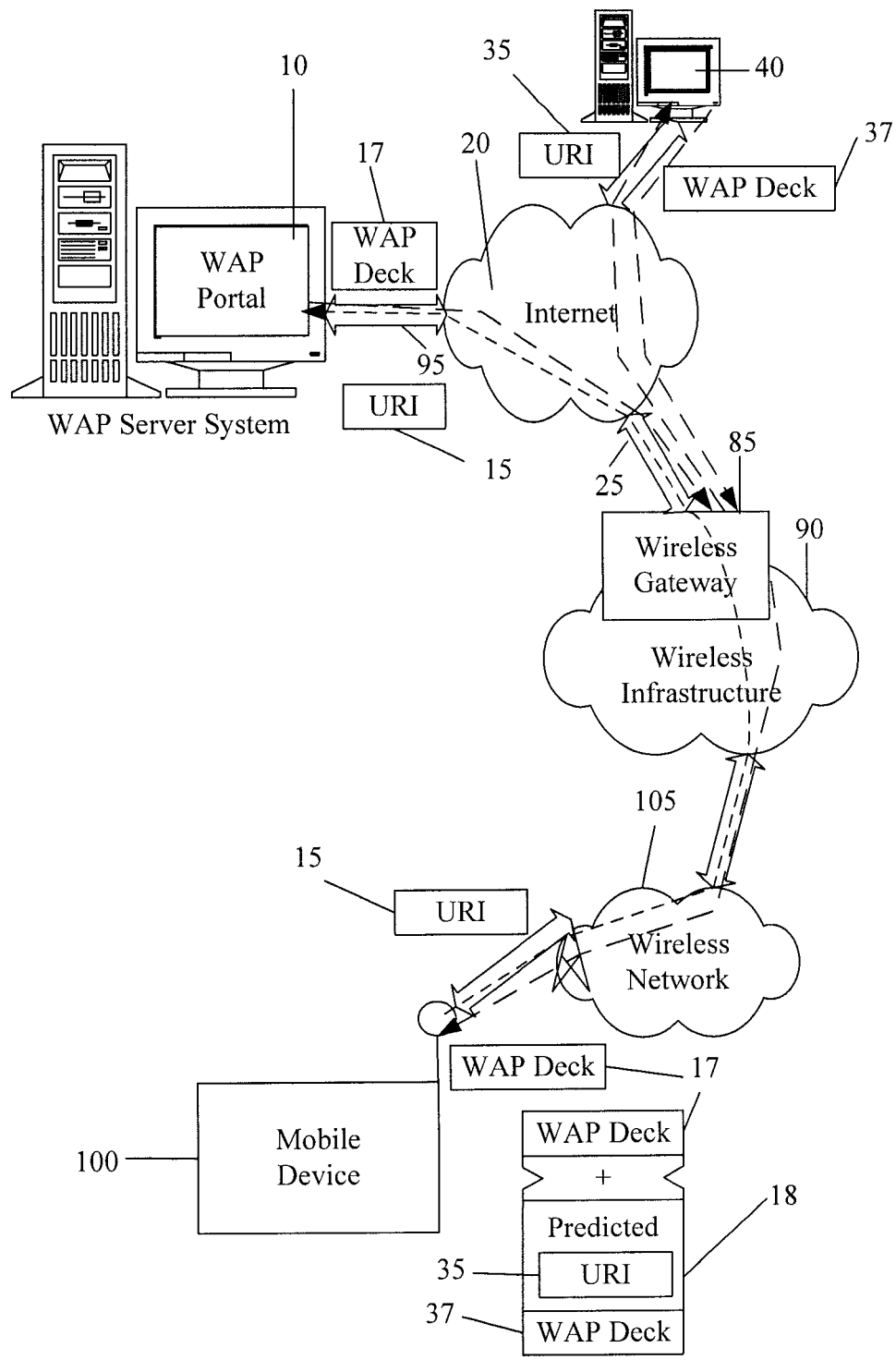
FIG. 1 is an illustrative communication system in which the systems and methods described herein may be used.

FIG. 1 is an illustrative communication system in which the systems and methods described herein may be used. The system includes a data portal 10, the Internet 20, a data server 40, a wireless gateway 85, wireless infrastructure 90, a wireless network 105, and a mobile device 100. Other systems may also be used with the system and method disclosed herein.

The data portal 10 and the data server 40 are illustratively WAP compliant devices. Other data portals or servers, such as an HTML, cHTML, xHTML, and XML servers and portals can also be used. Typically, the portal 10 and server 40 may be similar devices, i.e., the portal 10 may be realized by a server, and may also function as a proxy server. The portal 10, however, is typically administered by a mobile device carrier or service provider.

The wireless gateway 85 and the wireless infrastructure 90 provide a link between the Internet 20 and wireless network 105, collectively forming an exemplary information transfer mechanism. The wireless infrastructure determines the most likely network for locating a given user and may track the user as they roam between countries or networks.

The wireless infrastructure 90 includes a series of connections to the wireless network 105. These connections may be Integrated Services Digital Network (ISDN), Frame Relay or T1 connections using the TCP/IP protocol used throughout the Internet.

As used herein, the term "wireless network" may cover many different types of wireless networks, such as (1) data-centric wireless networks, (2) voice-centric wireless networks and (3) dual-mode networks that can support both voice and data communications over the same physical base stations. In addition to these types of wireless networks, other wireless networks may also be used.

Examples of combined dual-mode networks include, but are not limited to (1) the Code Division Multiple Access (CDMA) network that has been developed and is operated by Qualcomm, (2) the Groupe Special Mobile or the Global System for Mobile Communications (GSM) and the General Packet Radio Service (GPRS) network both developed by the standards committee of CEPT, and (3) the future third-generation (3G) networks like Enhanced Data-rates for Global Evolution (EDGE) and Universal Mobile Telecommunications Systems (UMTS). GPRS is a data overlay on the very popular GSM wireless network, operating in virtually every country in Europe.

Examples of data-centric networks include the Mobitex™ Radio Network, which has been developed by Eritel and Ericsson of Sweden, and is operated by BellSouth (Cingular) Wireless Data in the United States and Rogers/Cantel in Canada, and the DataTAC™ Radio Network, which has been developed by Motorola and is operated by American Mobile Satellite Corporation (AMSC), now called Motient, in the United States and Bell Mobility in Canada. Examples of voice-centric data networks include Personal Communication Systems (PCS) networks like CDMA, GSM, and TDMA systems that have been available in North America and worldwide for nearly 10 years.

The portal 10 may also be located within a company LAN or WAN, or in another network, such as in a large Application Service Provider (ASP), and provides an interface for information exchange over the Internet 20. The portal 10 may also include dynamic database storage engines that have pre-defined database formats for data such as calendars, to-do lists, task lists, e-mail and documentation, and may also provide links to information sources that it serves, such as the WAP deck 17, as well as links to information served by other servers, such as WAP deck 37 served by the WAP server 40, and other systems connected to the Internet 20.

The WAP decks 17 and 35 comprise documents written in the Wireless Markup Language (WML) protocol. WML uses the metaphor of card decks for documents, and each page of a WML document is referred to as a card, and the entire document is referred to as a deck. Thus, a WAP document typically comprises a series of sections or pages, called cards, each of which holds the data for one screen/window in a WAP browser.

The WAP deck 17 may be requested by a mobile device user, and is delivered to the mobile device 100 via wireless transmission, typically over a radio frequency (RF) link from a base station in the wireless network 105. The particular network 105 may be realized by any wireless network over which information may be exchanged with the mobile device 100.

When a user requests data at the mobile device 100, the mobile device 100 conducts a data pull of the requested information. The mobile device 100 typically sends a Uniform Resource Identifier (URI), such as URI 15 that corresponds to a resource request from the portal 10. The mobile device 100 may be configured to send other types of data requests according to different communication protocols in addition to the exemplary URI 15, such as a URL for a web page, an IP address of a server, a file transfer protocol (FTP) request, and the like. Additionally, while the URI 15 illustratively corresponds to the portal 10, the URI 15 may instead correspond to other devices or systems in communication with the Internet 20.

When the portal 10 receives the URI 15, the portal 10 normally responds by sending the WAP deck 17 to the mobile device 100. The WAP deck 17 is typically transmitted to the mobile device 100 via the wireless gateway 85. If the portal 10 has the WAP deck 17 stored locally, then it may immediately send the WAP deck 17 to the mobile device 100. If the portal 10 does not have the WAP deck 17 stored locally, then it may request and receive the WAP deck 17 from another source. Upon receiving the WAP deck 17, the mobile device 100 presents the WAP deck 17 to the user, and the data pull is completed.

Typically, upon receiving the WAP deck 17, the user of the mobile device 100 may thereafter request another WAP deck after examining the information presented in the WAP deck 17. For example, if the WAP deck 17 includes stock quote information for a number of stocks, the user of the mobile device 100 may subsequently request information related to one of the number of stocks, either from the same portal 10, or from another portal or server in communication with the Internet 20. The user must then wait until the corresponding information or data is received at the mobile device 100.

Additionally, if the information received at the mobile device 100 comprises additional embedded URIs, then selection of the URI by the user will cause the mobile device 100 to issue another URI request, and the user must then wait until the corresponding information or data is received at the mobile device 100.

To minimize the associated latency for these subsequent requests, the systems and methods disclosed herein push forecasted response information in addition to the response information transmitted to the mobile device 100. A forecasted data request based on previous data requests issued from the mobile device 100 or other mobile devices is generated by the portal 10. If the portal 10 has the response data to the forecasted data request stored locally, then it may immediately send the response data with the WAP deck 17 to the mobile device 100. If the portal 10 does not have the response data stored locally, then it may request and receive the response data from another source. Once received, the response data is provided to the mobile device 100 with the WAP deck 17.

The forecasted data request may also be provided to the mobile device 100. For example, when the WAP deck 17 is transmitted to the mobile device, predicted information 18 is pushed with the WAP deck 17. If the forecasted data request is a URI 35, then the predicted information 18 may include the forecasted URI 35 and the corresponding WAP deck 37. The predicted information 18 may be stored in a cache within the mobile device 100, or a similar memory store within the mobile device 100.

The URI 35 may, for example, be related to a link found in the WAP deck 17. If the URI 35 is requested by the mobile device 100, and the URI 35 and corresponding deck 37 was not stored in the cache of the mobile device 100, then the mobile device 100 would transmit the URI 35 query to the portal 10. However, since the URI 35 and corresponding WAP deck 37 were provided in the predicted information 18, the mobile device 100 need not actually transmit the URI request, as the corresponding deck 37 is available in the mobile device 100 cache. Thus, a subsequent request to the deck 17 is pre-empted, thereby reducing latency experienced by the user of the mobile device 100.

Figure 2:
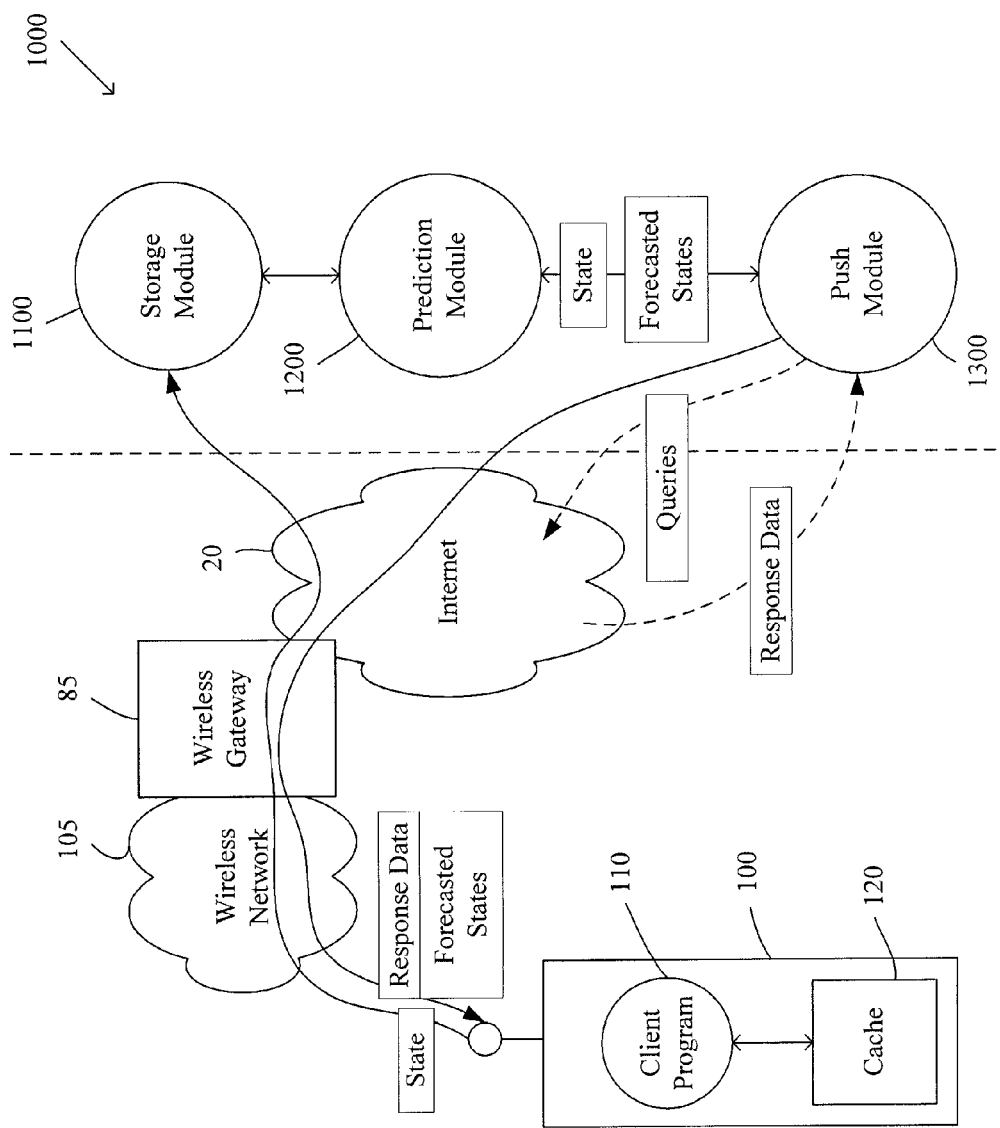
FIG. 2 is an embodiment of a system for handling mobile device information requests.

FIG. 2 is an embodiment of a system 1000 for handling mobile device 100 information requests. The mobile device 100 typically comprises a client program 110 and an associated cache memory 120. An exemplary mobile device 100 may be of the type described with reference to FIG. 11, below. While only one mobile device 100 is illustrated, a plurality of mobile devices may also be in communication with the system 1000.

The system 1000 includes a storage module 1100, a prediction module 1200, and a push module 1300. The storage module 1100, prediction module 1200 and push module 1300 may collectively form a push server responsive to data requests from the mobile device 100. The push server may be embodied in a single computer, or may instead be distributed over a plurality of computer devices. For example, the storage module 1100 and the prediction module 1200 may be located on a first computer device, and the push module 1300 may be located on a second computer device in communication with the first computer device.

Each of the storage module 1100, prediction module 1200, and push module 1300 may comprise a software program or software system structure and associated hardware for performing the programmed tasks. Any number of software languages or software programming platforms may be used to construct these modules. Additionally, although the storage module 1100, prediction module 1200, and the push module 1300 are depicted as separate modules, the modules may be combined into a single module to consolidate functional tasks, or, alternatively, may be subdivided to distribute functional tasks. In the illustrative embodiment of FIG. 2, each data request of the mobile device 100 is modeled as a state. The storage module 1100 is operable to receive and store states transmitted from the mobile device 100 and other mobile devices. In one embodiment, a mobile device state may comprise a URI.

The prediction module 1200 is operable to receive states from the mobile device 100 and in response access the storage module 1100, and predict one or more forecasted states based on the received data request and the stored states. The prediction module 1200 may execute a prediction algorithm, such as a Markov chain, an n-gram sequence model, a weighted most recently used algorithm, or other prediction algorithm. The prediction may involve comparing the received state to the stored states, or comparing the received state to prediction data generated from the stored states. In the case of comparing the received state to the prediction data generated from the stored states, the stored states may be deleted after the prediction data are generated to conserve storage space.

The prediction module 1200 provides the forecasted states to the push module 1300. The push module 1300 is operable to receive the requested state from the mobile device 100 and the predicted states from the prediction module 1200, and in response request and receive response data responsive to the forecasted state and the requested states. For example, if the mobile device state and forecasted states comprise URIs, then the push module 1300 executes URI queries. The response data is then transmitted to the mobile device 100. In one embodiment, the response data also includes the forecasted states.

In another embodiment, the prediction module 1200 predicts forecasted states and provides the forecasted states to the push module 1300 independent of receiving a state from the mobile device 100. The push module 1300 is operable to receive the forecasted states from the prediction module 1200 and request and receive response data responsive to the forecasted states. The prediction module 1200 may be further configured to predict forecasted states and provide the forecasted states to the push module on a periodic basis. For example, if a user of the mobile device 100 typically access a news service and a sports service during a certain time of day, e.g., between the hours of 7:00 AM and 8:00 AM, the prediction module 1200 may predict the requisite URI queries for the news service and the sports service within this time period, and provide the URI queries to the push module 1300. The push module 1300 then executes the URI queries, and the response data is transmitted to the mobile device 100. This operation may occur independent of receiving a state from the mobile device 100, e.g., the mobile device 100 may be in a standby mode, or the user may not have yet selected a particular state relating to the news service or sports service. Accordingly, the user of the mobile device 100 will have the information related to the news service and sports service information available at the mobile device 100 when the user does select the news service or sports service. To help maintain accuracy of future predictions, the mobile device 100 may be further configured to transmit a successful prediction notification back to the prediction module 1200 when the mobile device 100 accesses the predicted states. Thus, the prediction module 1200 may then update prediction algorithm data to reflect whether a successful prediction notification was received from the mobile device 100. For example, the failure to receive successful notifications for a particular predicted state during a time period may result in the prediction module 1200 removing the particular state from the prediction data, or lowering the likelihood of predicting the particular state in the future.

The successful prediction notification may also comprise data indicating whether the mobile device 100 accessed the response data provided. The mobile device 100 can be configured to determine whether the response data pushed from the push module 1300 has been accessed during an access time period. Thus, instead of waiting to receive the successful prediction notification during the time period, the prediction module 1200 may interrogate the successful prediction notification when it is received. Accordingly, if the response data has been accessed during the access time period, then the successful prediction notification indicates that a successful prediction occurred. If the response data has not been accessed during the access time period, however, then the successful prediction notification indicates that an unsuccessful prediction occurred.

In another embodiment, the push module 1300 may be implemented by a request module operable to receive the received data request and the forecasted data request from the prediction module and in response issue requests for response data related to the received data request and the forecasted data request to be transmitted to the mobile device 100 over a wireless network. Thus, the request module need not receive the respective response data for the received data request and the forecasted data request; rather, response data for the received data request and the forecasted data request are provided to the mobile device 100 via communications from devices responsive to the respective requests. In a variation of this embodiment, the request module may separately transmit the forecasted states to the mobile device 100.

Figure 3:
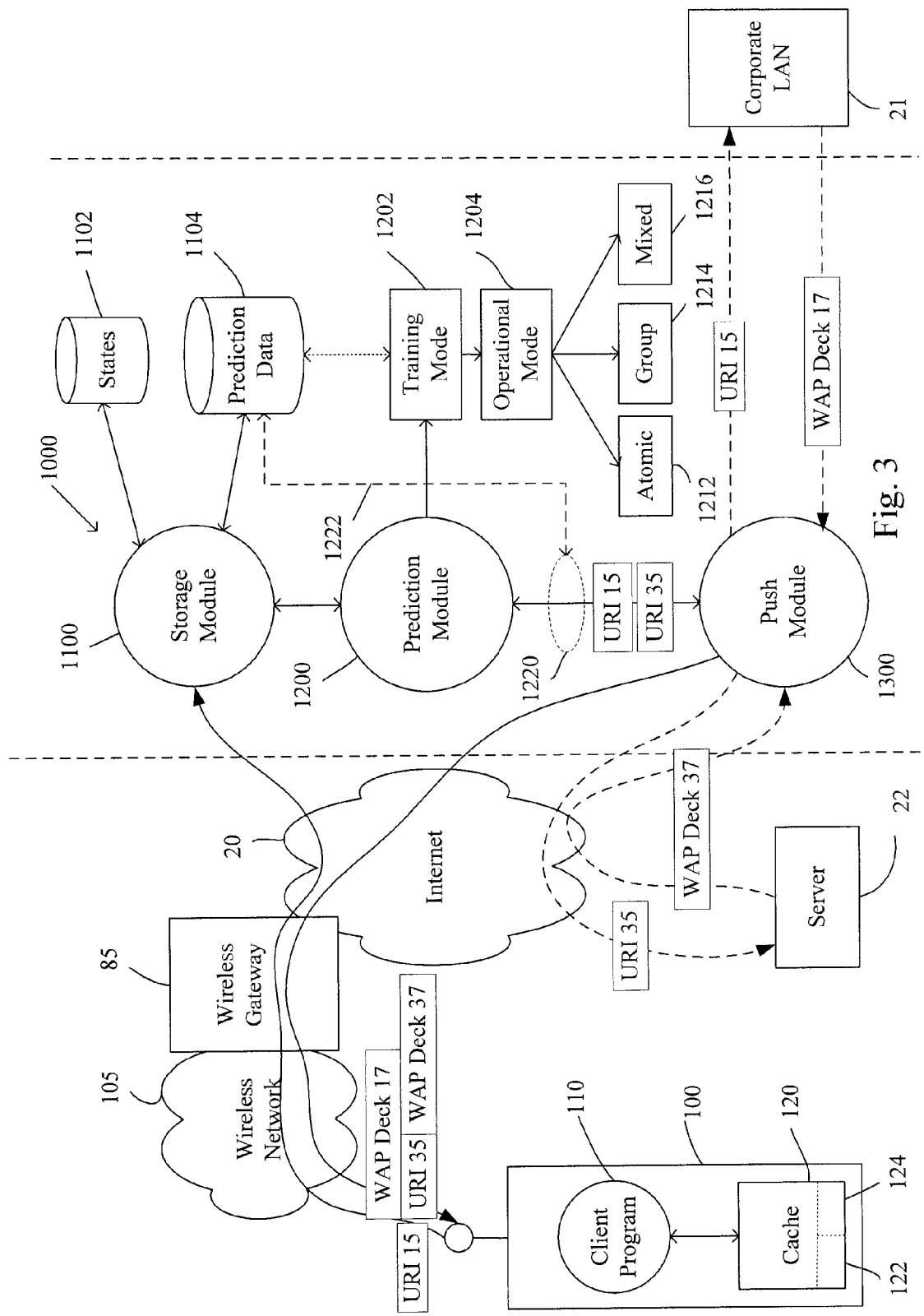
FIG. 3 is another embodiment of a system for handling mobile device information requests.

FIG. 3 provides another embodiment of the system 1000 for mobile device 100 information requests. In this embodiment, the storage module 1100 includes memory stores 1102 and 1104 for storing mobile device states and prediction data. Typically, the transmission from the mobile device 100 will also include a mobile device 100 identifier, and thus a state history for each mobile device 100 may be stored in the memory store 1102. Likewise, prediction data corresponding to each mobile device in communication with the system 1000 may also be stored in the memory store 1104.

The prediction module 1200 is operable to predict one or more forecasted states based on the received data request and the stored states. Illustratively, the prediction module 1200 may predict the forecasted states by utilizing only the previous states stored in the memory store 1102, or may also be configured to utilize the prediction data stored in memory store 1104. Alternatively, the prediction module 1200 may be configured to rely solely on the prediction data stored in the memory store 1104 to predict the forecasted states.

The prediction module 1200 may operate in a training mode 1202 to generate prediction data to be stored in the memory store 1104, and then transition to an operational mode 1204. In this embodiment, the prediction module 1200 defines one or more collection frames during which time states are collected for the mobile device 100 or other mobile devices. At the expiration of the collection frame, prediction data are generated or adjusted. The prediction data are then evaluated to determine whether to define another collection frame for further adjustment of the prediction data, or to transition to an operational mode 1204.

During the operational mode, the prediction module may operate in an atomic mode 1212, a group mode 1214, or a mixed mode 1216. In the atomic mode 1212, the prediction module 1200 uses historical states of the mobile device 100, or historical states from a group of relatively homogenous users, to predict forecasted states.

An example of a group of homogenous users is employees of a particular division in a company. Another example of a group of homogenous users is users with similar data request histories. Other techniques of defining groups of homogenous users may also be used.

In the group mode 1214, the prediction module 1200 uses historical states on a larger group of mobile devices 100. For example, a group mode prediction could be based on the historical states of all users of mobile devices 100.

Finally, in mixed mode 1216, the prediction module 1200 operates first in the atomic mode 1212, and then switches to the group mode 1214 if a strong prediction cannot be made in the atomic mode 1212. The strength of the prediction may be measured by the ability to recognize a reference pattern, or the likelihood of the prediction being correct exceeding a threshold probability, or by other methods.

In operation, the mobile device 100 may issue a data request via the URI 15. The URI 15 is transmitted over the wireless network 105 and the Internet 20 to the storage module 1100, and the state is stored in the memory store 1102. The URI 15 is then provided to the prediction module 1200, which accesses the memory stores 1102 and/or 1104 and predicts one or more forecasted states. In this example, the prediction module 1200 predicts only one state, URI 35, as the forecasted state.

The URIs 15 and 35 are provided to the push module 1300, which then executes the respective URI queries. The URI 15 may correspond to server located on a corporate LAN 21, in which case the WAP deck 17 is provided in response. The URI 35 may correspond to a server 22 located somewhere in the Internet 20, and the corresponding WAP deck 37 is provided in response.

The WAP deck 17, URI 35, and the WAP deck 37 are then transmitted to the mobile device 100 as response data. Upon receiving the response data, the WAP deck 17 is accessed by the client program 110 operating on the mobile device 100, and the URI 35 and WAP deck 37 are stored in the client program cache 120. If the user thereafter requests the URI 35, the prediction is successful. As a result of the successful prediction, the WAP deck 37 is provided from the cache 120, and is thus immediately available to the user of the mobile device 100.

In another embodiment, the cache 120 of the mobile device 100 may also comprise a client program cache 122 and a push cache 124. The client program 110 may be configured to store the response data to the requested state, such as the WAP deck 17 provided in response to the URI 15, in the client program cache 122, and store the response data to the forecasted state, such as the URI 35 and WAP deck 37, in the push cache 124. Typically, data stored in the cache 120 may have associated refresh or expiry data, such as an expiration header field, that instructs the client program 110 to query a data source and request updated data. In this embodiment, such expiry data or refresh data in the response data stored in the push cache 124 is ignored by the client program 110. Thus, the client program 110 may search the push cache 124 for forecasted data responsive to a second, subsequent state, and will not execute a data request if the expiry data or refresh data indicates stale data.

If the response data stored in the push cache 124 is responsive to the subsequent state, i.e., the next state was correctly predicted by the prediction module 1200, then the client program 110 may transfer the forecasted response data from the push cache 124 to the client program cache 122. If the response data stored in the push cache 124 is not responsive to the subsequent state, however, then the forecasted response data may be deleted, and the state requested by the mobile device 100 is transmitted over the wireless network 105 to the storage module 1100.

One or more forecasted states may be predicted and pushed to the mobile device 100. For example, if four states are predicted, and the response data for the four states are provided to the mobile device 100, then the mobile device 100 need not transmit a data request over the wireless network as long as the subsequent states requested by the user are among the four predicted states. In yet another embodiment, upon exhausting the successful predictions, the mobile device 100 transmits a successful prediction notification to the prediction module 100. The prediction module 1200 then predicts additional forecasted states based on the last successfully predicted state of the mobile device 100, and pushes the response data to the mobile device 100. Thus, a new set of response data for one or more predicted states may be pushed to the mobile device 100 without user intervention.

In addition to being operable to predict one or more forecasted states based on the received data request and the stored states, the prediction module 1200 may also be operable to predict one or more forecasted states independent of receiving a state from the mobile device 100. Furthermore, the mobile device 100 may be further operable to transmit back to the prediction module 1200 a successful prediction notification as confirmation that the prediction module 1200 correctly predicted the one or more forecasted states independent of a received data request. The operation of the prediction module 1200, push module 1300, and the mobile device 100 in this configuration are as described with reference to FIG. 2 above. In another embodiment, upon predicting the forecasted states, the prediction module 1200 may further compare a resource metric associated with pushing data related to the forecasted states to a system metric 1220. The system metric 1220 may be a cost metric, such as a cost of providing the data to the mobile device 100, or a resource metric, such as available system bandwidth. Other metrics may also be used. The system metric 1220 may be used to update or adjust the prediction data stored in the memory store 1104, as indicated by arrow 1222.

Based on the system metric 1220, the prediction module 1200 may determine the maximum number of particular states and related data to push to the mobile device 100 that is cost effective. If the particular forecasted states are not cost effective, or exceed the maximum number of cost effective states, then some, or even all, of the forecasted states may be cancelled. Alternatively, the prediction module may be further configured to generate another set of forecasted states, or modify the first set of forecasted states if the first set of predicted states is not cost effective.

Figure 4:
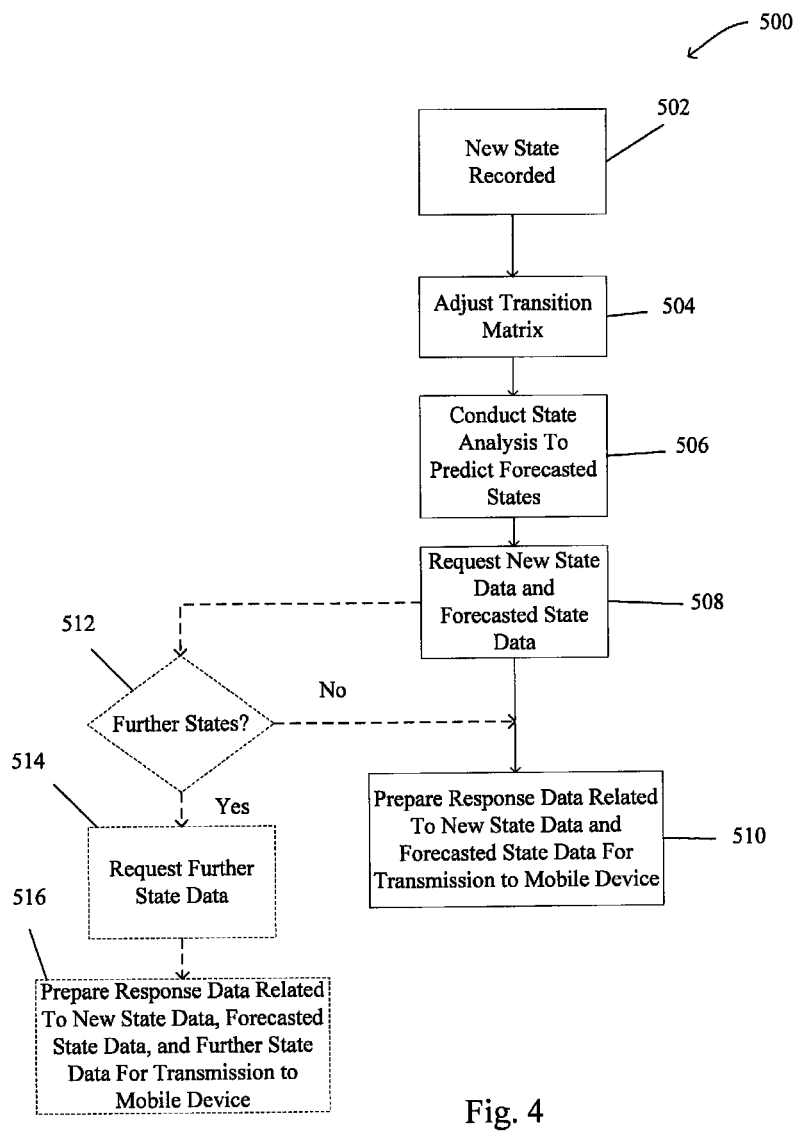
FIG. 4 is a flow diagram of a method of handling mobile device information requests.

FIG. 4 is a flow diagram 500 of a method of handling a mobile device information request. At step 502, a new state for the mobile device is recorded by the storage module 1100. Typically, the new state corresponds to a data request received from the mobile device via a transmission over a wireless network. The new state may correspond to a particular mobile device if a mobile device identifier is included in the data request.

At step 504, the prediction data may be adjusted by the prediction module 1200. Depending on the prediction algorithm implemented in the prediction module 1200, the prediction data may be updated with each new state recorded, or may alternatively be updated only if the new state renders the existing prediction data inaccurate or in need of adjustment. Factors that may determine whether the prediction data is updated may include sample space size, history size, the particular prediction algorithm, and the like. At step 506, the prediction module conducts a state analysis to predict forecasted states of the mobile device 100. The prediction may be subject to a mode selection, such as an atomic mode 1212, a group mode 1214, or a mixed mode 1216.

At step 508, the forecasted states are provided to the push module 1300, which requests the new state data requested by the mobile device and the forecasted state data related to the forecasted states. Finally, at step 510, response data including the new state data and the forecasted state data are prepared for transmission to the mobile device. The response data may comprise only the new state data and the forecasted state data, or may further include the forecasted state corresponding to the forecasted state data.

In another embodiment, the push module 1300 may be operable to determine whether the response data includes further state requests, as shown in step 512. For example, an HTML document may comprise URLs to other data servers, and accessing the HTML document will cause a browser program to issue a query to the other data servers associated with the embedded URLs.

To obviate the need for such operations at the mobile device 100, the push module, upon determining that the response data includes further state requests, requests further response data in response to the further state requests, as shown in step 514. Upon receiving the further response data, the push module 1300 prepares response data that includes the new state data and the forecasted state data, and also includes the further response data related to the further state requests, as shown in step 516.

Figure 5:
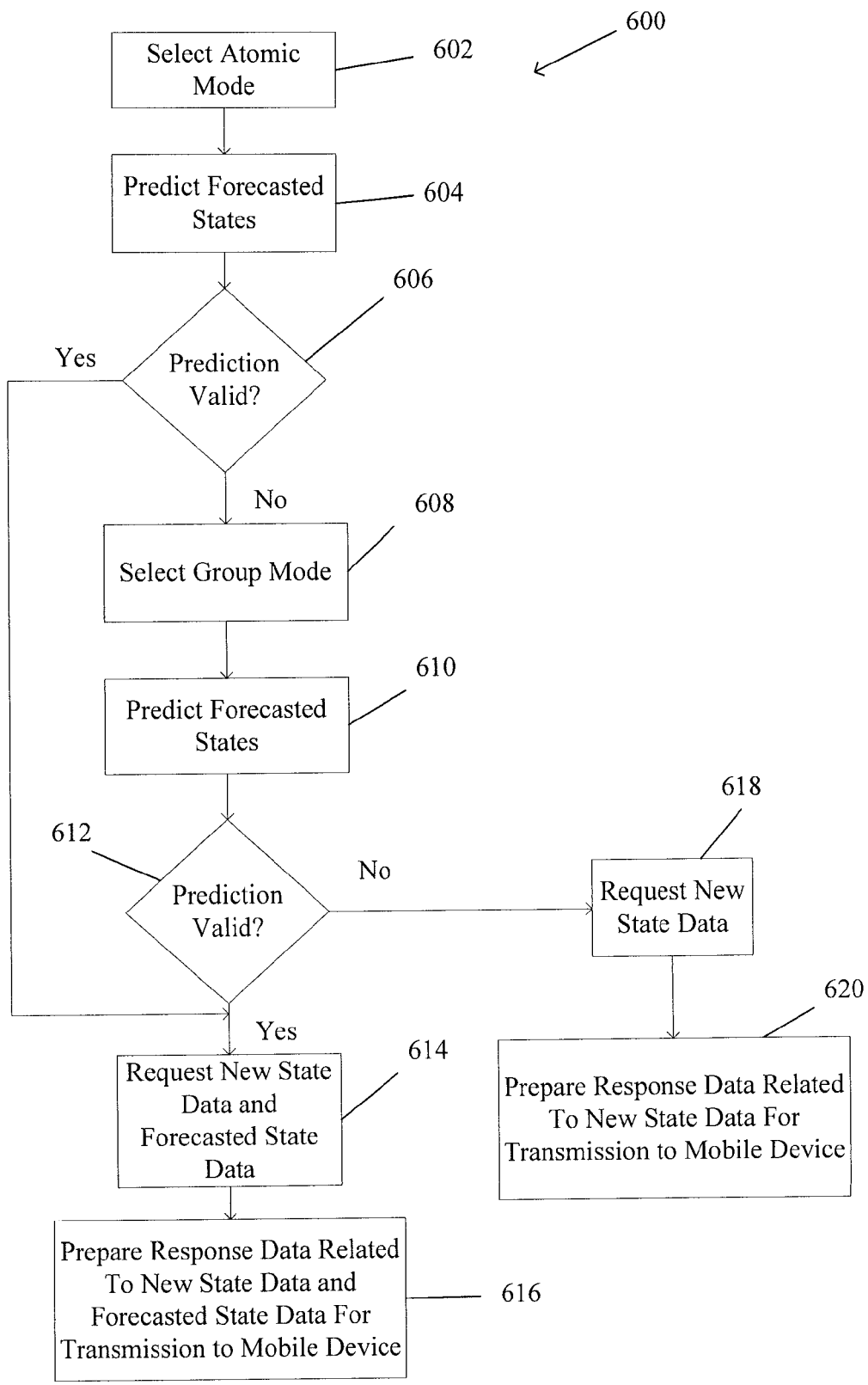
FIG. 5 is a flow diagram illustrating a mode selection in a prediction module.

FIG. 5 is a flow diagram 600 illustrating a mode selection in the prediction module 1200. At step 602, the prediction module 1200 selects the atomic mode 1212 as a default mode. Accordingly, the prediction module 1200 utilizes the historical states of a particular mobile device 100, or historical states from a group of relatively homogenous users to predict forecasted states.

At step 604, the prediction module 1200 predicts forecasted states based on the atomic mode data. At step 606, the prediction module 1200 determines whether the forecasted states are valid. The validity of the forecasted states may be determined by a corresponding probability of the prediction exceeding a threshold, or by the prediction module 1200 being able to determine forecasted states based on the atomic data, or by other methods.

If the prediction is not valid, then the prediction module 1200 selects the group mode 1214, as shown in step 608. At step 610, the prediction module 1200 predicts forecasted states based on the group mode data. At step 612, the prediction module 1200 determines whether the forecasted states are valid.

If the forecasted states predicted in step 604 were valid, or, alternatively, if the forecasted states predicted in step 604 were invalid and the forecasted states predicted in step 610 are valid, then in step 614 the new state data and the forecasted state data are requested. In step 616, the response data received are prepared for transmission to the mobile device. Thus, the forecasted states and corresponding state data are pushed to the mobile device along with the state data requested by the mobile device.

If the forecasted states predicted in step 610 were invalid, however, then the new state data is requested in step 618, and the response data related to the new state data received in step 620 is prepared for transmission to the mobile device. Thus, only the state data requested by the mobile device is provided to the mobile device.

Figure 6:
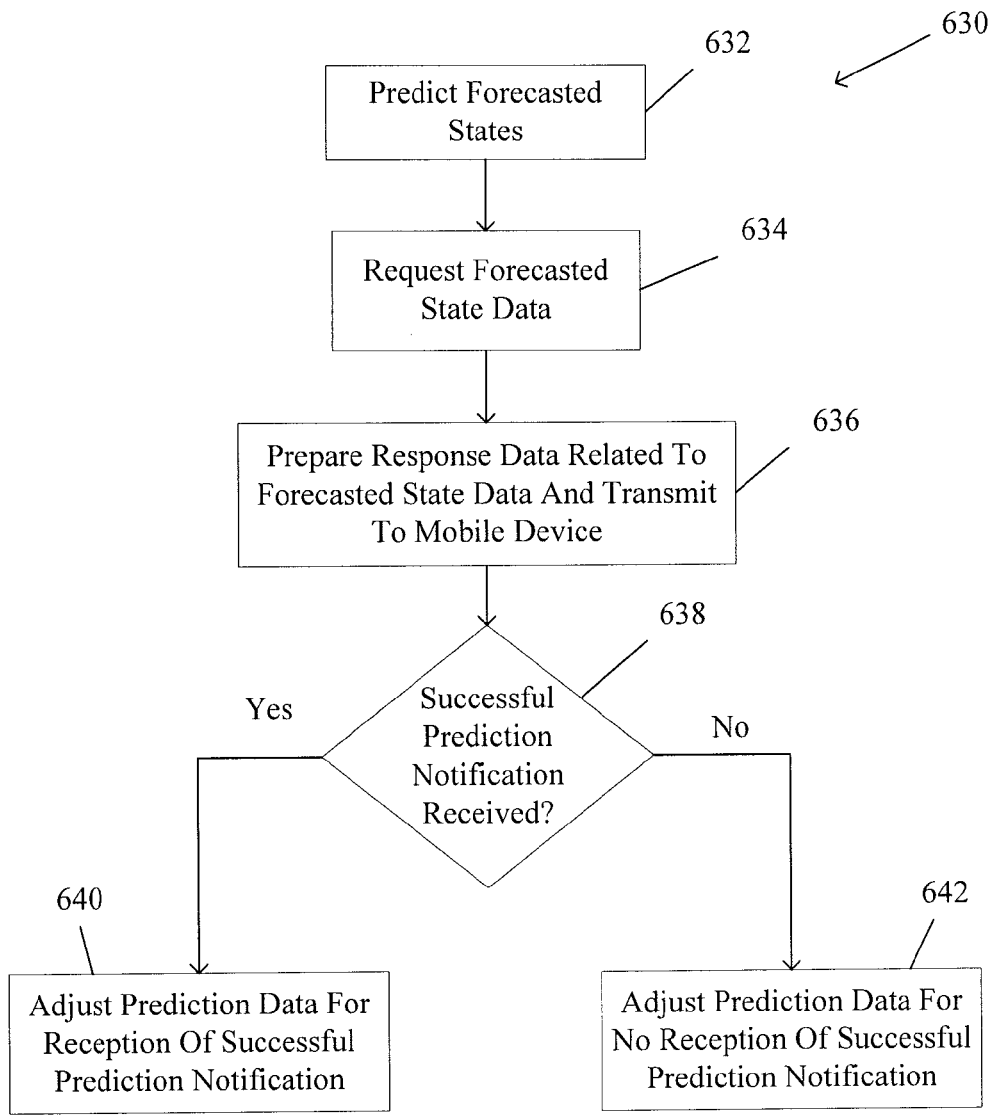
FIG. 6 is a flow diagram illustrating another method of handling mobile device information requests.

FIG. 6 is a flow diagram 630 illustrating another method handling mobile device information requests. In the flow diagram 630, the prediction module 1200 predicts forecasted states independent of receiving a state from the mobile device 100. The method of the flow diagram 630 may be implemented after set of prediction data for a particular mobile device 100 or group of mobile devices has been developed, such as described with reference to steps 502 and 504 of FIG. 4.

At step 632, the prediction module 1200 predicts forecasted states. The prediction may be triggered by an event independent of receiving a state request from a mobile device 100. The event may be a particular time of day, a particular day of the week, or some other event.

At step 634, the forecasted states are provided to the push module 1300, which requests the forecasted state data related to the forecasted states. At step 636, the response data comprising the forecasted state data is prepared and transmitted to the mobile device 100.

At step 638, the prediction module 1200 determines if a successful prediction notification has been received from the mobile device 100. The determination may be subject to a time-out period. For example, if the prediction module 1200 predicts forecasted states on a periodic basis, the time-out period may be the prediction period, or a time period less than the prediction period, e.g., one hour.

If a successful prediction notification is received, then at step 640 the prediction data is adjusted by the prediction module 1200 for the reception of the successful prediction notification. Depending on the prediction algorithm used, adjusting the prediction data in step 640 may result in maintaining or increasing the likelihood of future predictions for the forecasted states predicted in step 632.

If a successful prediction notification is not received, however, then at step 642 the prediction data is adjusted by the prediction module 1200 for no reception of a successful prediction notification. Depending on the prediction algorithm used, adjusting the prediction data in step 642 may result in maintaining or decreasing the likelihood of future predictions for the forecasted states predicted in step 632.

In another embodiment, the successful prediction notification may comprise data indicating whether the mobile device 100 accessed the response data provided at step 636. In this embodiment, the mobile device 100 is configured to determine whether the response data pushed from the push module 1300 has been accessed during an access time period. If the response data has been accessed during the access time period, then the successful prediction notification indicates that a successful prediction occurred. If the response data has not been accessed during the access time period, however, then the successful prediction notification indicates that an unsuccessful prediction occurred.

Figure 7:
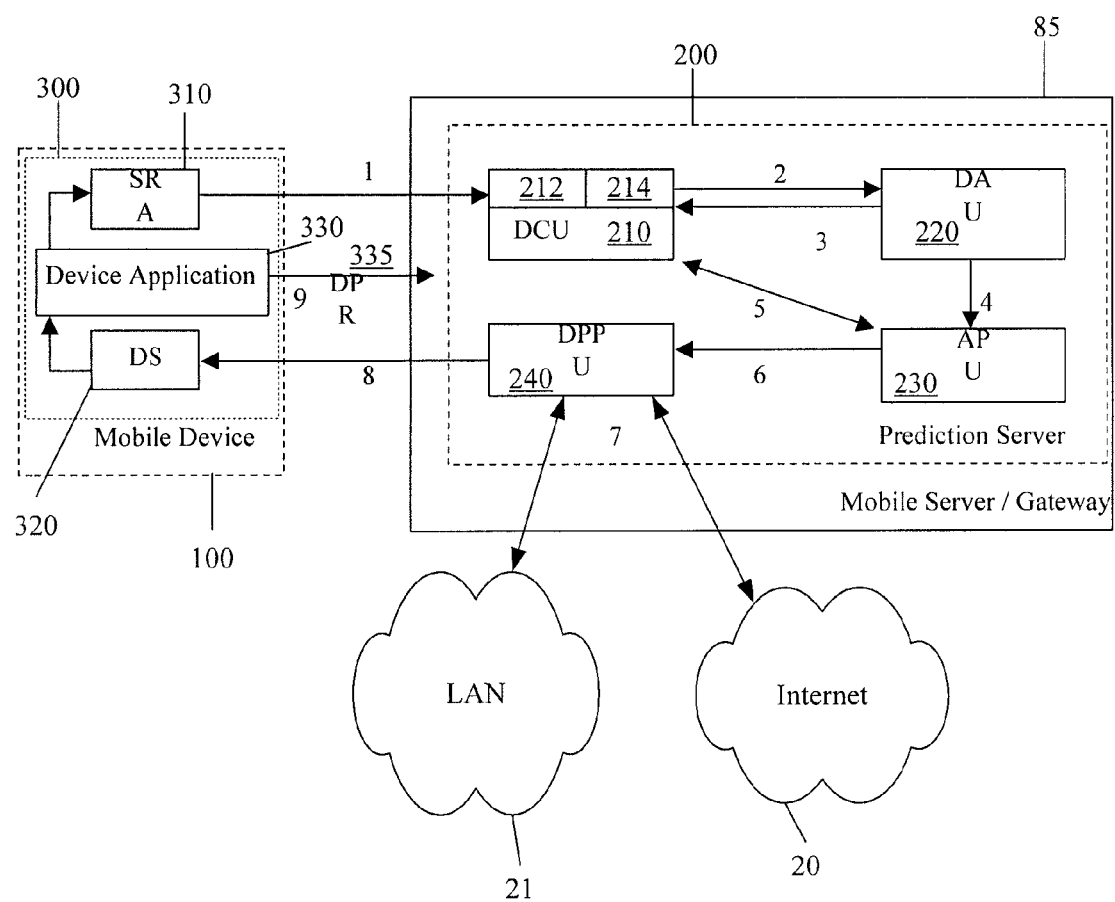
FIG. 7 is a diagram of another embodiment of a system for handling mobile device information requests.

FIG. 7 is a diagram of another embodiment of a system for handling mobile device information requests. In this embodiment, a prediction server 200 is implemented in the wireless gateway 85 of FIG. 1, and illustratively comprises a Data Collection Unit (DCU) 210, a Data Adjustment Unit (DAU) 220, an Analysis and Prediction Unit (APU) 230, and a Data Preparation and Push Unit (DPPU) 240. The prediction server 200 may be implemented at other locations, however, such as at the portal 10, or another server operable to communication with the wireless device 100 over the network shown in FIG. 1.

The mobile device 100 comprises a prediction client 300, which may include a State Reporting Agent (SRA) 310 and a Data Store (DS) 320 for pushed data. Also illustrated in FIG. 7 is a device application 330, which may be a mobile device browser, such as a WAP browser, or other mobile device communication program. The DS 320 may comprise a browser cache or mobile application-specific cache. The device application 330 may be configured to check the DS 320 for cached information before issuing a data pull request to the prediction server 200, and the SRA 310 may interact with a particular device application 330 to receive notification of a user request for a specific URI. When notified, the SRA 310 utilizes the wireless connection to transmit URI data to the server side DCU 210.

The device application 330 may also include the functionality of the SRA 310 and the DS 320. For example, a WAP browser may report the mobile device state with each URI query, and the WAP browser cache may store information for the WAP browser. Thus, the prediction server 200 and pushed response data may be integrated in a transparent manner to the mobile device 100 user.

The DCU 210 may comprise a device state listener 212 and the state storage component 214. When the mobile device 100 reports a new state, the state listener 212 receives the data, which typically comprises a device ID and state URI, and redirects the data to the state storage component 214. In alternate embodiments, the device state listener 212 can be implemented as a socket server, stream connection listener, or servlet. The device state listener 212 may be embodied using software as a stand-alone process or as a thread within the DCU 210 or prediction server 200. Other implementation schemes may also be used.

The state storage component 214 comprises a state data storage for states received from the device state listener 212 and hierarchical data storage of states structured according to mobile device users' historical activity patterns. States received from the device state listener may be stored temporarily, while the hierarchical data storage may be operable to store data persistently. The hierarchical data storage may be implemented using a relational or object database, XML data store, or serialized files. Other file structures may also be used.

The DAU 220 is notified when a new state is provided to the data storage of the DCU 210. The DAU 220 receives the state URI and device ID from the state data storage and the corresponding historical data from the DCU 210 hierarchical data storage. The hierarchical data storage may be updated according to a prediction algorithm, such as Markov weighted probabilities, two-way sorting, n-gram sequence model, and the like. In one embodiment of the DAU 220, two separate threads are utilized, a first thread for new state notification, and a second thread for state processing.

The APU 230 is notified by the DAU 220 when the DAU 220 completes the update to the hierarchical data storage 214. The APU 230 then executes the prediction algorithm on the data from the DCU 210 to predict the next state or states of the mobile device 100. The next states may represent the most likely user navigation steps following the current requested device 100 state.

The APU 230 may operate in three prediction modes: atomic mode, group mode, and mixed mode. In a manner as previously described with respect to the embodiment of FIG. 2, the atomic mode operates on the historical information of a particular mobile device 100 or a relatively small group of homogeneous users, and makes predictions based on this information. The group mode operates on a much greater data sample collected on a large user population. The mixed mode operates on the mobile device specific data first and, if there is not enough information to make a strong prediction (e.g. either the preference pattern is not recognizable or a subgraph has not yet been visited by the mobile device), the APU 230 switches to the group mode data to make a prediction.

The APU 230 prediction may comprise one or more forecasted states. The DPPU 240 receives the forecasted states from the APU 230, and requests and receives data associated with each forecasted state from the Internet 20 or local network 21. In one embodiment, the DPPU 240 may incorporate content caching to optimize collection of the data responsive to the forecasted states.

After the response data related to the forecasted states are received, the DPPU 240 packs the forecasted states and associated response data into a single buffer for transmission to the mobile device 100. The DPPU 240 may also perform additional optimization steps, such as content transcoding, compressing, and the like. The DPPU 240 then provides the response data to a mobile gateway server to execute the push to the mobile device 100.

The DS 320 at the mobile device 100 receives the set of response data transmitted by the DPPU 240. In one embodiment, the DS 320 may be realized by a cache for a WAP browser operating on the mobile device 100. In another embodiment, the DS 320 may be realized by a push cache associated with the device application 330. In the case of correct prediction, the next state selected at the mobile device 100 will be satisfied from the DS 320, and thus latency is minimized.

Operation of the embodiment FIG. 7 may be summarized according to the following data operations as indicated by the referenced arrows. Upon a new state notification, the SRA 310 sends state information to DCU 210 (1). The new state is recorded, and the DCU 210 notifies DAU 220 (2). The data storage is adjusted (3), if required, and the DAU 220 notifies the APU 230 (4). The APU 230 executes the prediction algorithm on the DCU 210 data (5), and the predicted states are provided to the DPPU 240 (6). The DPPU 240, in turn, requests and receives the corresponding response data (7), and the response data and predicted states are prepared for transmission to the mobile device 100 (8).

These data operations need not occur according to the order depicted in FIG. 7. For example, the device application 330 may issue a traditional data pull request (9), which can be used as a trigger for initiating any one or several of the operations described above.

In an alternative embodiment of FIG. 7, the APU 230 is further operable to execute the prediction algorithm on the data from the DCU 210 to predict the states of the mobile device 100 independent of a new state reported by the mobile device 100. For example, the APU 230 may predict the states of the mobile device 100 on a periodic basis. For example, if a user of the mobile device 100 typically access a news service and a sports service during a certain time of day, e.g., between the hours of 7:00 AM and 8:00 AM, the APU 230 may execute the prediction algorithm at the beginning of this time period. In this embodiment, the DAU 220 may also be operable to receive a successful prediction notification from the mobile device 100 and update the state storage component in the DCU 210.

Figure 8:
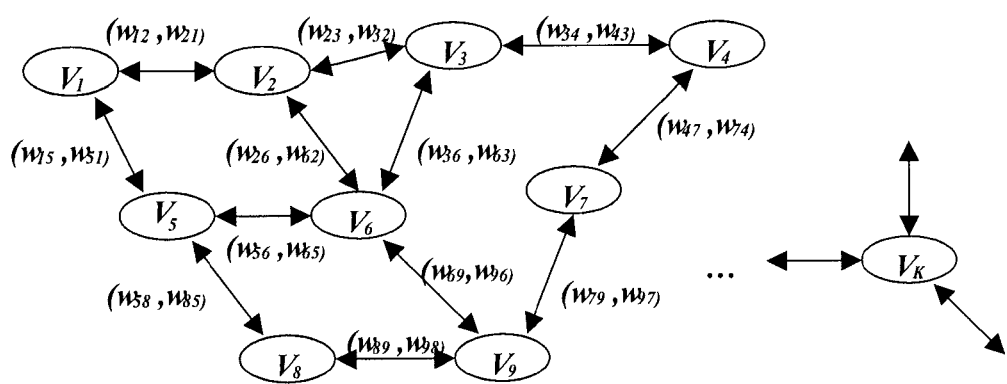
FIG. 8 is a weighted graph model of mobile device activity.

FIG. 8 illustrates a weighted graph model of mobile device activity. In this graph model, each of the edges represent two directions, and each of the vertices represents a mobile device state, such as a cHTML or xHTML pages, WAP deck, data screens, etc.

Moving along the edge represents a transition from a first state to a next state. Thus, if an edge exists between any two arbitrary vertices A and B, then the edge represents both transition from vertex A to B and from B back to A, and has a pair of associated weights ($W_{AB}$, $W_{BA}$), one weight per direction. For example, the edge connecting vertices V1 and V2 has weights ($W_{12}$, $W_{21}$). In this regard, the edges denote bi-directional transitions between the information states.

During a training period, states requested by a mobile device or mobile devices are observed. The weights for each vertex weight may represent the number or frequency of transitions along each direction of the edge during a training period, or may represent any other decision supporting measure based on subscriber historic activity.

The graph of FIG. 8 can be used to predict the most likely subset of future transitions (edges) and response data (vertices) based on the current information state of the mobile device and historically accumulated user activity data. When the most likely set of future information units is identified, it is pushed to the mobile device to minimize data access latency observed by a subscriber.

A variety of mathematical models and prediction algorithms may be used to realize the graph of FIG. 8. In the embodiment of FIG. 7, for example, a Markov chain model may be implemented. The weighted directional graph of FIG. 8 can be adapted as a Markov chain by ensuring that edge weights are probabilities of transitions between state vertices. Thus, the graph may be normalized at each vertex in order for each vertex to have the total weight of outgoing edges to be equal to a probability of 1. The graph operates with the Markov chain states corresponding to atomic units of information (e.g., cHTML or xHTML documents, WAP decks, data screens, etc.) and edge transitions that represent mobile user navigation from one vertex to another to predict forecasted states.

Ordinarily, a Markov chain model with n states $S=\{s_1, s_2, \ldots s_n\}$ is fully described by a state vector $Z_t$ and transition matrix T. At any discrete moment t the state of the system can be stochastically defined using the formula:

$$Z_t = TZ_{t-1} = T^{t-1}Z_0,$$

where $Z_0$ is an initial state of the chain.

A Markov chain model may also comprise a history-determined Markov chain. Unlike regular or state-determined chains, the future state of the history-determined Markov chain is described by not only the current state of the chain but rather by a finite sequence of preceding states. This class of Markov chains provides a more accurate model of dynamic systems and also facilitates a self-learning system.

For a generic history-determined chain, the state vector can be defined as:

$$Z_t = F(Z_{t-1}, Z_{t-2}, \ldots, Z_{t-k}),$$

where F is a state transformation function and k is a history depth. The set $(Z_{t-1}, Z_{t-2}, \ldots, Z_{t-k})$ is a historic states pattern, and may provide more accurate prediction results than prediction results based on a single states pattern.

For the history-determined Markov chain, the wireless environment may be modeled according to the follow propositions:

Cardinality of a Markov chain model for a generic multi-user environment is virtually indefinite: $\lim_{t \to \infty} |S_t| = \infty$, and tends to cover the whole sample space $\Omega$;

Cardinality of a Markov chain modeling an activity of a single user or a homogeneous group of users is much smaller and a vector of states $S_t = \{S_1, S_2, \ldots S_n\}$ at any given time t represents only a subset of $\Omega$; and For a single user model, or a homogeneous group of users, the following assumption (stochastic limitation of a state set cardinality) applies:

if $\theta_t$ is an observed state of the model at a moment t then:

$$\forall \rho > 0 \; \exists n < \infty : P\{\theta_t \in S_t\} > 1-\rho \text{ and } |S|_t < n$$

where P {A} is the probability of event A.

Figure 9:
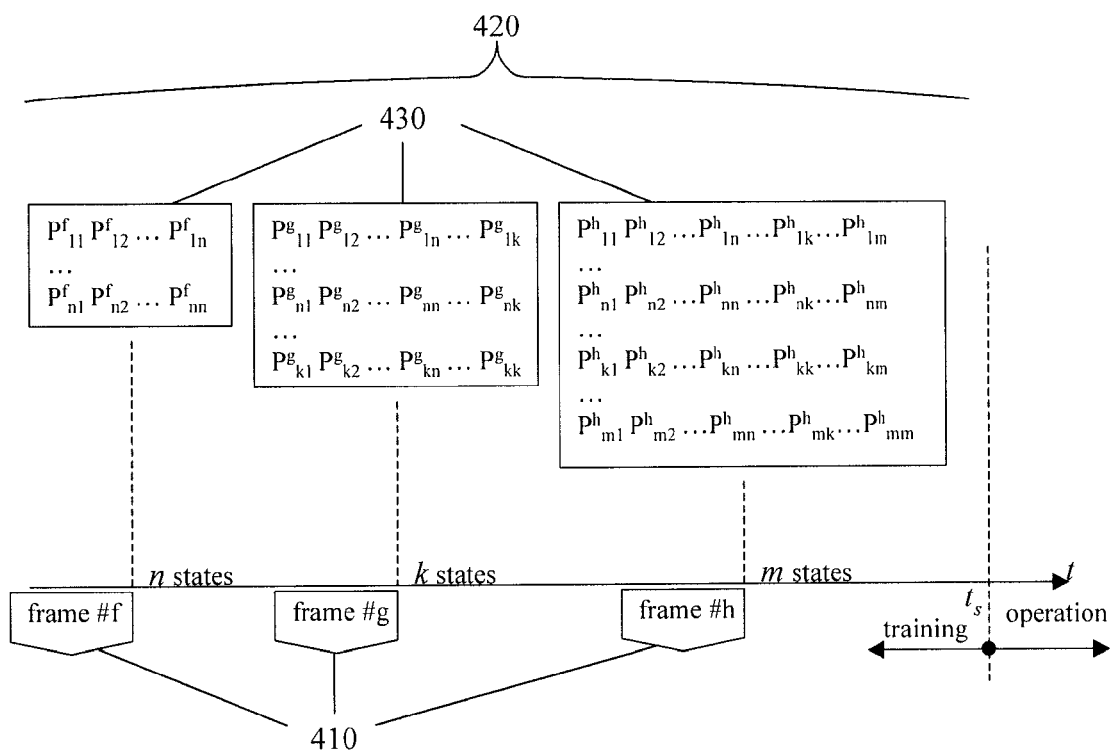
FIG. 9 shows a transition matrix T structure and adjustment process during a training phase.

The graph of FIG. 8 is generated during a training mode. FIG. 9 shows an exemplary transition matrix T structure and adjustment process during the training phase. In each frame, $P^r_{ls}$ represents a transition probability from state l to s as per matrix 430 state at the end of frame r. The state vector S and transition matrix T 430 may be adjusted by first defining collection frames 410. A collection frame is a time interval over which the model operates without changing S or T. At the end of each frame 410, the collected data is analyzed and S and T are adjusted for the next frame.

During the training phase 420, model space S is likely to grow, and during the operational phase |S| will likely stay steady even though the individual states might be added or removed reflecting user activity pattern changes. The frame size may change in transition from training to operational phase, as it is likely to grow until the system achieves stability.

A frequency analysis may be used to adjust S at the end of the collection frame. For example, if a state θ was visited by the system at least K times during the past frame, the state is added to vector S. If the state θ was not visited by the system during the past M frames, the state is removed from S. Removal of unused, or rarely used, model states increases performance efficiency by limiting the state size. Optimal values of K and M depend on application specifics and size of controlled user group.

The transition matrix adjustment process occurs at the end of the first collection frame 410, at which time the frequency matrix F represents state transitions:

$$F = \begin{vmatrix} 0 & f_{12} & \dots & f_{1n} \\ f_{21} & 0 & \dots & f_{2n} \\ \dots & \dots & \dots & \dots \\ f_{n1} & f_{n2} & \dots & 0 \end{vmatrix}$$

where:

$f_{ij}$ is a frequency of transitions from state i to state j; and n is a number of model states monitored during past collection frame, and includes existing model states and new states visited more than the threshold value K times during past collection frame.

Weight coefficient α that represents a refresh rate for the transition matrix F may used for frame-adjusting the matrix T according to the following relation:

$p_{ij}=\alpha f_{ij}+(1-\alpha)p_{ij}$, if i existed prior to the past frame $p_{ij}=f_{ij}$, otherwise Note that if the transition matrix T is zero-extended for new states prior to calculation, then the relation above is identical to $T=\alpha F+(1-\alpha)T$.

The weight coefficient α is adjusted during training and operational phases so that α->0 as the model matures. Adjusting the weight coefficient a will affect how rapidly the system converges during the training mode. Generally, a smaller incremental change in the weight coefficient α will result in additional collection frames.

Unused or rarely used states are removed to complete the adjustment process. If rows are removed for unused states, no further adjustment is required. If columns are removed for unused states, however, a probability normalization is required. The probability normalization may be expressed as:

$P_{ij}=P_{ij}/\Sigma_{j<m}P_{ij}$, where m is a new number of states.

At a time $t_s$, a saturation point is reached, and the system transitions to an operational mode.

The saturation point may be expressed as:

$\Omega(\Delta T)_n < X$, where

Ω is a metric defined on the matrix ΔP $(\Delta T)_n$ is a matrix of probability adjustments over the last collection frame n X is a saturation point criterion.

The term X may be a predefined scalar number that represents a quantitative upper boundary for the frame-to-frame transition matrix T adjustment, and Ω may be a norm defined on the matrix ΔT. The following two matrix norms may be used for this purpose:

The Hilbert-Schmidt norm (sum of square differences):

$$|\Delta T|_2 = \sqrt{\Sigma_{ij}(\Delta t_{ij})^2} < X \qquad (i)$$

The L1 maximum absolute column sum norm:

$$|\Delta T|_1 = \max_j \Sigma_{i=1\dots n} |\Delta t_{ij}| < X \qquad (i)$$

Either of these norms provides a condition (i) for the selected matrix to satisfy over a number of consecutive frames, thereby triggering the system to change into an operational mode.

During the operational mode, the system predicts forecasted mobile device states based on the current mobile device state and historically collected data about states space S and transitional probabilities between states T. An exemplary prediction process may be based on the following variables:

Prediction depth W: a maximum number of information units (Markov chain states) that is time/price efficient to direct to the mobile device during one push;

Transition path $Z_n$: a set of ordered states $Z_n=\{z_1, z_2, z_3, \dots z_n\}$, n<W;

Probability metric $P_{Z_n}$: a composite probability measure defined on the set $Z_n$ to identify an optimal path out of all possible paths;

Cost function $C_k$: represents a cost of push data transmission for k pages; and Weight function $F_{Z_n}=P_{Z_n}+\beta C_n$, where β is a cost weight coefficient.

The prediction process predicts an optimal path $Z_n$, based on the historical mobile device states. The predicted states $z_1, \dots z_n$ and associated response data are pushed to the mobile device. For example, given x as a current state of the mobile device, the following predicted forecasted states may occur:

i. (consequent) $x$->$z_1$->$z_2$->$z_3$-> . . . ->$z_n$ ii. (parallel) $x$->$z_1$->$z_2$ $x$->$z_3$-> . . . ->$z_k$ $x$->$z_2$->$z_5$-> . . . ->$z_n$ Consequent states represent forecasted states that are predicted to be subsequently visited in response to the current state x. For example, if the next three consecutive states to be visited by the mobile device are predicted to be URIs $z_1$, $z_2$ and $z_3$, then data for these states are pushed to the mobile device.

Parallel states represent all possible forecasted states that are predicted to be visited in response to the current state x. For example, x is a vertex in a weighted directional graph, then the states $z_1$, $z_2$, and $z_3$ are connected to the state x by an edge weight.

For every new state of the mobile device, the prediction algorithm can be configured for optimization, maximizing $F_{Z_n}$ over all possible $Z_n$ sets, n<W. A push occurs when the $F_{Z_n}$>$R_0$, where $R_0$ is a push validity threshold.

The cost function $C_k$ may be used to ensure a cost effective push of predicted data to the mobile device. For example, if $C_k=0$, W=1, then $F_{Z_n}=P_{Z_n}=P_{Z_1}$ $P_{Z_1}=Pxi$ (i ∈ S, x is a current device state)

Then the resulting $Z_1=\{i\}$: $Pxi=\max_{j \in s}(Pxj)$, i ∈S

Thus, a single state is forecasted and the response data is pushed to the mobile device 100.

While pushing just a single state and its corresponding response data to the mobile device may be practical for some information formats, e.g. WAP decks, it may be desirable to predict a forecast of multiple states. Thus, $C_k=0$, W>1

$F_{Z_n}=P_{Z_n}$

A variable $r_0$ may be used to define a path selection probability threshold. The variable $r_0$ may correspond to a threshold probability, and a state transition from i to j is selected if $Pij > r_0$. Accordingly, the magnitude of $r_0$ will be proportional to the cardinality of a set of candidate states $Z^c$. From the set of candidate states $Z^c$, the set of forecasted states $Z_n$ can be selected.

The candidate set of predicted states $Z^c$ is generated by first selecting all states $z_1$ for which $Pxz_1 > r_0$. States meeting this criteria are then added to the set of predicted states $Z^c$. For all of the states in the set of predicted states $Z^c$, a subsequent forecasted state is predicted by selecting all states $z_2$ for which $Pz_1z_2 > r_0$. States meeting this criteria are then added to the set of predicted states $Z^c$, and a set of forecasted paths are stored (i.e. $x \rightarrow z_1 \rightarrow z_2$).

The steps are repeated until one of three events occur: $|Z^c| = W$; or the path length exceeds W ($x \rightarrow z_1 \rightarrow z_2 \ldots \rightarrow z_w$); or the selection process cannot find any transition with $Pz_k j > r_0$ at the step $k < W$.

After the forecasted paths are generated, the candidate set of states $Z^c$ is evaluated to determine whether optimization is required. If $|Z^c| \leq W$, then the predicted set of states $Z_n = Z^c$. No optimization is required, and the forecasted states and response data may be pushed to the mobile device.

If $|Z^c| > W$, however, then an optimization is required. The optimization may be expressed as:

$$Z_n \epsilon Z^c : P_{Zn} = \max_{n \leq w} P(Z^c)$$

The optimized forecasted states and response data may then be pushed to the mobile device.

By adjusting the cost function $C_k$ to a value greater than 0 so that $F_{Zn} = P_{Zn} + \beta C_n$, then the candidate set of states $Z^c$ will be adjusted according to the value of the $\beta C_n$ for each corresponding state. Thus, by selecting $r_0$ and $C_k$, the set of candidate states $Z^c$ may be selected subject to various system efficiencies and resources available.

An example of selecting a candidate set of states $Z^c$ may be illustrated with reference to FIG. 8. Assuming the current mobile device state is $v_1$, then the next states are $v_2$ and $v_5$. If $w_{12} > r_0$, then $v_1 \rightarrow v_2$ is stored as a forecasted path. Likewise, if $w_{15} > r_0$, then $v_1 \rightarrow v_5$ is stored as a forecasted path. If consequent forecasted states are to be generated, then the forecasted path with the highest probability is stored. If parallel forecasted states are to be generated, however, then both $v_1 \rightarrow v_2$ and $v_1 \rightarrow v_5$ are stored as forecasted paths. The selection process continues until one of the three termination events occurs.

In another embodiment, threshold $r_0$ is increased as the selection process forecasts each subsequent prediction from the current device state. This approach results in a smaller set of forecasted states, accommodates both cost considerations $C_k$ and validity threshold $R_0$, and simplifies the prediction process.

The probability measure P may be defined as a simple sum of transition probabilities along the paths in $Z^c$. For a less specific P, the transition paths should be kept intact while finding a maximization subset of candidate set $Z^c$, i.e. if the state $z_m$ is chosen, then all the states in a path from x to $z_m$ are to be chosen as well.

Figure 10:
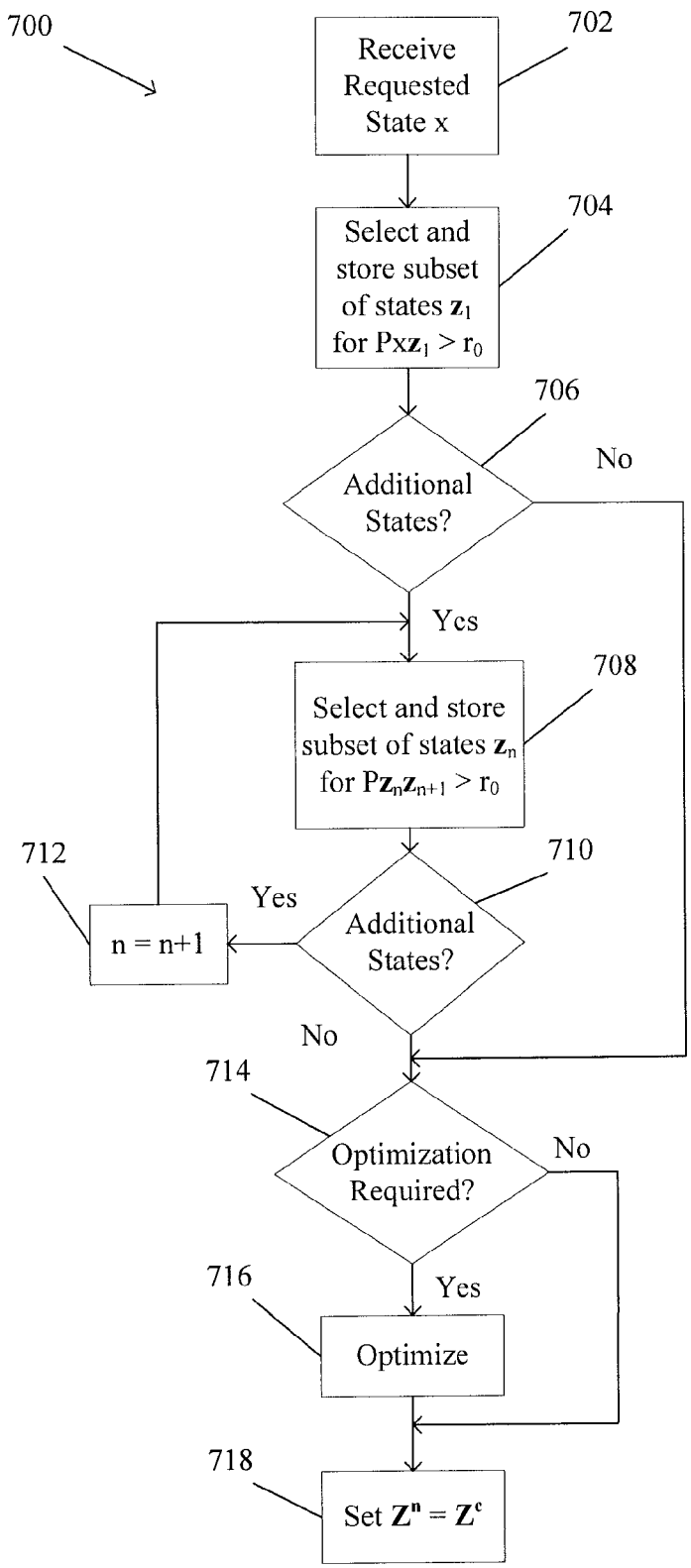
FIG. 10 is a flow diagram illustrating a candidate state selection process.

FIG. 10 is a flow diagram 700 illustrating another embodiment of the candidate state selection process. At step 702, a requested state x is received from a mobile device. At step 704, a subset of states is selected from all states $z_1$ having a transition probability $Pxz_1 > r_0$. In the embodiment of FIG. 10, states $z_1$ are all states having a transition probability from state x that is greater than 0. The subset of states is then stored as the candidate set of states $Z^c$.

Step 706 determines if additional states remain. Additional states may remain, for example, if the selected subset of states from $z_1$ have transition probabilities to other states $z_n$. If additional states are available, then another subset of states is selected, as shown in step 708, and the state paths are stored in the candidate set of states $Z^c$. Step 710 then determines if additional states remain. If so, state selections are incremented, as shown in step 712, and step 708 is repeated.

Once no additional states remain, as determined by either step 706 or 710, then step 714 determines if an optimization of the candidate set $Z^c$ is required. If optimization is required, then step 716 optimizes the candidate set $Z^c$ in a manner as previously described. After optimization, or if no optimization is required, then the forecasted states r are set to the candidate set $Z^c$, as shown in step 718.

Figure 11:
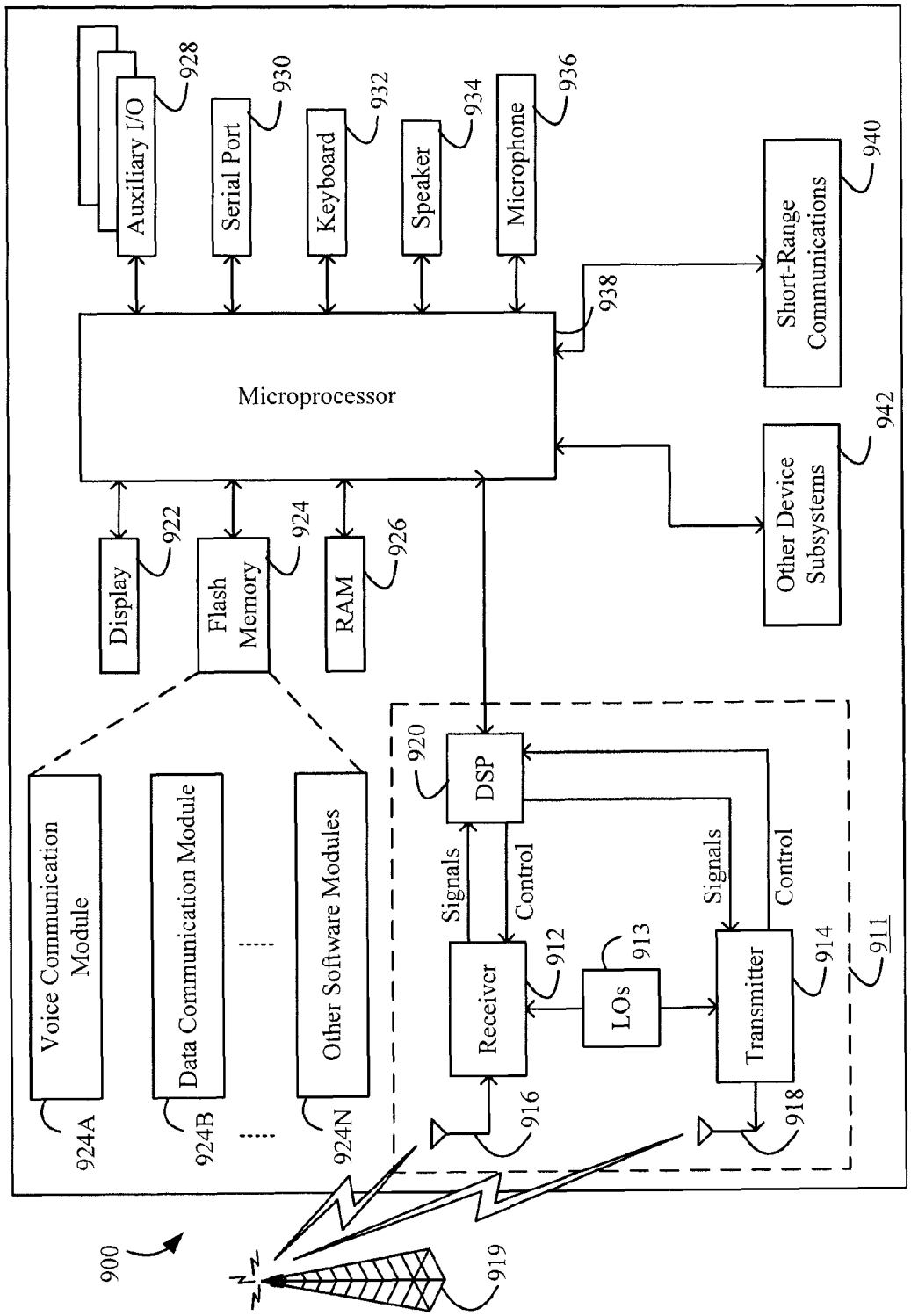
FIG. 11 is a schematic diagram of an exemplary mobile device.

FIG. 11 is a schematic diagram of components that could make up a wireless device that could be used as a mobile device with the invention.

Turning now to FIG. 11, there is a block diagram of a wireless device 900 in which portions of the instant invention may be implemented. The wireless device 900 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 900 is enabled for two-way communications, the device will incorporate a communication subsystem 911, including a receiver 912, a transmitter 914, and associated components such as one or more, preferably embedded or internal, antenna elements 916 and 918, local oscillators (LOs) 913, and a processing module such as a digital signal processor (DSP) 920. The particular design of the communication subsystem 911 will be dependent upon the communication network in which the device is intended to operate. For example, a device 900 destined for a North American market may include a communication subsystem 911 designed to operate within the Mobitex mobile communication system or DataTAC mobile communication system, whereas a device 900 intended for use in Europe may incorporate a General Packet Radio Service (GPRS) communication subsystem 911.

Network access requirements will also vary depending upon the type of network 919, such as Wireless Network 105 of FIG. 1. For example, in the Mobitex and DataTAC networks, mobile devices such as 900 are registered on the network using a unique personal identification number or PIN associated with each device. In GPRS networks, however, network access is associated with a subscriber or user of a device 900. A GPRS device, therefore, requires a subscriber identity module (not shown), commonly referred to as a SIM card, in order to operate on a GPRS network. Without a SIM card, a GPRS device will not be fully functional. Local or non-network communication functions (if any) may be operable, but the device 900 will be unable to carry out any functions involving communications over network 919. When required network registration or activation procedures have been completed, a device 900 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 11, analog to digital conversion. Analog to digital conversion of a received signal allows more complex communication functions, such as demodulation and decoding, to be performed in the DSP 920. In a similar manner, signals to be transmitted are processed, including modulation and encoding, for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 900 preferably includes a microprocessor 938, which controls the overall operation of the device. Communication functions, including at least data and voice communications, are performed through the communication subsystem 911. The microprocessor 938 also interacts with further device subsystems, such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 11 perform communication-related functions, whereas other subsystems may provide "resident" or on-device functions. Notably, some subsystems, such as keyboard 932 and display 922, for example, may be used for both communication-related functions, such as entering a text message for transmission over a communication network and device-resident functions such as a calculator or task list.

Operating system software used by the microprocessor 938 is preferably stored in a persistent store such as flash memory 924, which may instead be a read only memory (ROM) or similar storage element (not shown). The operating system, specific device applications, or parts thereof, may be temporarily loaded into a volatile store such as RAM 926. It is contemplated that received communication signals may also be stored to RAM 926. Flash memory 924 preferably includes data communication module 924B, and when device 900 is enabled for voice communication, a voice communication module 924A. Also included in flash memory 924 are other software modules 924N, which are also shown as prediction client 300 of FIG. 7.

The microprocessor 938, in addition to its operating system functions, preferably enables execution of software applications on the device. A predetermined set of applications that control basic device operations, including at least data and voice communication applications, for example, will normally be installed on the device 900 during manufacture. A preferred application that may be loaded onto the device may be a personal information manager (PIM) application having the ability to organize and manage data items relating to the device user, such as, but not limited to, e-mail, calendar events, voice mails, appointments, and task items. Naturally, one or more memory stores would be available on the device to facilitate storage of PIM data items on the device. Such PIM application would preferably have the ability to send and receive data items via the wireless network. In a preferred embodiment, the PIM data items are seamlessly integrated, synchronized and updated, via the wireless network, with the device user's corresponding data items stored or associated with a host computer system. Also preferred is a browser application, such as device application 330 of FIG. 7. Further applications may also be loaded onto the device 900 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the device 900.

In a data communication mode, a received signal such as a text message or web page download will be processed by the communication subsystem 911 and input to the microprocessor 938, which will preferably further process the received signal for output to the display 922, or alternatively, to an auxiliary I/O device 928. A user of device 900 may also compose data items, such as e-mail messages, for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 900 is substantially similar, except that received signals would preferably be output to a speaker 934 and signals for transmission would be generated by a microphone 936. Alternative voice or audio I/O subsystems, such as a voice message recording subsystem, may also be implemented on the device 900. Although voice or audio signal output is preferably accomplished primarily through the speaker 934, the display 922 may also be used to provide an indication of the identity of a calling party, the duration of a voice call, or other voice call related information, for example.

The serial port 930 would normally be implemented in a personal digital assistant (PDA)-type communication device for which synchronization with a user's desktop computer (not shown) may be desirable, but is an optional device component. Such a port 930 would enable a user to set preferences through an external device or software application and would extend the capabilities of the device by providing for information or software downloads to the device 900 other than through a wireless communication network. The alternate download path may, for example, be used to load an encryption key onto the device through a direct and thus reliable and trusted connection to thereby enable secure device communication.

A short-range communications subsystem 940 is a further optional component which may provide for communication between the device 900 and different systems or devices, which need not necessarily be similar devices. For example, the subsystem 940 may include an infrared device and associated circuits and components or a Bluetooth™ communication module to provide for communication with similarly-enabled systems and devices.

This written description uses illustrative embodiments to disclose the invention, including the best mode, and also to enable a person of ordinary skill in the art to make and use the invention. Other embodiments are within the scope of the claims if they have elements that do not differ from the literal language of the claims or have equivalent elements.

The invention claimed:

1. A method for handling data requests from a communication device, comprising:
    storing data requests received from the communication device;
    predicting a data request forecast algorithm based on the stored data requests; and
    requesting and receiving response data and pushing the response data to the communication device over a wireless network, at a time based on the data request forecast algorithm;
    transmitting, by the communication device, a successful prediction notification in response to the communication device accessing the predicted states; and
    updating the data request forecast algorithm based on whether the successful prediction notification is received from the communication device within a set time period, by predicting additional forecasted data requests based on receipt of the notification within the set time period, and by removing or lowering the likelihood of predicting the particular request in the future based on not having received the notification within the set time period.

2. The method of claim 1 wherein the step of requesting, receiving and pushing are performed by a wireless gateway.

3. The method of claim 1 wherein, in the predicting step, the prediction algorithm is developed by observing requests by the communication device in a training period to develop the prediction algorithm such that each vertex weight represents the number or frequency of transitions along each edge direction during the training period.

4. The method of claim 1 wherein, in the predicting step, the prediction algorithm is developed using a training mode, to define one or more collection frames during which time states are collected for the communication devices, and to generate or adjust prediction data at the expiration of the respective collection frame.

5. The method of claim 4 wherein in the training mode, after the expiration of the respective collection frame, the prediction data is evaluated to determine whether to define another collection frame for further adjustment of the prediction data or to transition to an operational mode.

6. The method of claim 1 wherein the communication device includes a client program cache and a separate push cache, and is configured to store the response data to the received data request in the client program cache, and to store the response data to the forecasted data request in the push cache.

7. The method of claim 6 wherein each response data in the push cache has associated expiry data, and the communication device executes a data request for data in the push cache if the respective expiry data indicates stale data.

8. The method of claim 1 wherein the predicting of the forecasted data request is based on what data the communication device is currently requesting.

9. The method of claim 1 wherein the communication device is a mobile device.

10. A method for handling web page requests by a communication device, comprising:
    generating a data request forecast algorithm based on web page requests received from a communication device, the algorithm being defined by a mapping of different available web pages, the algorithm including, for each pair of web pages i and j, a probability weighting $W_{ij}$ of web page i being requested after web page j was requested and also an probability weighting $W_{ji}$ of web page j being requested after web page i was requested, with at least some of the web pages being included in more than two of the web page pairs;
    determining that a communication device recently requested a web page; and
    pushing, to the communication device, another web page that is selected based on the probability, according to the algorithm, that it will be requested by the communication device.

11. The method of claim 10 wherein, in the generating step, each probability indication $W_{ij}$ is determined based on the number or frequency of requests that each web page i was requested after web page j was requested.

12. The method of claim 10 wherein, in the generating step, the probability indications $W_{ij}$ are based on requests from multiple communication devices.

13. The method of claim 10 wherein the steps of generating, determining and pushing are performed by a wireless gateway.

14. The method of claim 10 wherein, in the generating step, the prediction algorithm is developed by observing requests by the communication device in a training period to develop the prediction algorithm such that each vertex weight represents the number or frequency of transitions along each edge direction during the training period.

15. The method of claim 10 wherein, in the generating step, the prediction algorithm is developed using a training mode, to define one or more collection frames during which time states are collected for the communication device, and to generate or adjust prediction data at the expiration of the respective collection frame.

16. The method of claim 15 wherein in the training mode, after the expiration of the respective collection frame, the prediction data is evaluated to determine whether to define another collection frame for further adjustment of the prediction data or to transition to an operational mode.

17. The method of claim 10 wherein the communication device includes a client program cache and a separate push cache, and is configured to store the response data to the received data request in the client program cache, and to store the response data to the forecasted data request in the push cache.

18. The method of claim 16 wherein each response data in the push cache has associated expiry data, and the communication device executes a data request for data in the push cache if the respective expiry data indicates stale data.

19. The method of claim 10 wherein the generating of the forecasted data request is based on what data the communication device is currently requesting.

20. The method of claim 10 wherein the communication device is a mobile device.

* * * * *